United States Patent
Smart (10) Patent No.: US 10,482,765 B2
(45) Date of Patent: Nov. 19, 2019

(54) ALLOCATING AN AREA TO A VEHICLE

(71) Applicant: SMART SHIP HOLDINGS LIMITED, Tortola (VG)

(72) Inventor: Billy Jay Junior Smart, Monte Carlo (MC)

( * ) Notice: Subject to any disclaimer, the term of this patent is extended or adjusted under 35 U.S.C. 154(b) by 0 days.

(21) Appl. No.: 15/377,164

(22) Filed: Dec. 13, 2016

(65) Prior Publication Data

US 2017/0098375 A1 Apr. 6, 2017

Related U.S. Application Data

(63) Continuation of application No. 14/344,947, filed as application No. PCT/GB2012/052276 on Sep. 14, 2012, now abandoned.

(60) Provisional application No. 61/668,215, filed on Jul. 5, 2012.

(30) Foreign Application Priority Data

Sep. 14, 2011 (GB) .................................. 1115897.9
Jul. 5, 2012 (GB) .................................. 1211970.7

(51) Int. Cl.
| | |
|---|---|
| *G08G 1/14* | (2006.01) |
| *G08G 3/00* | (2006.01) |
| *H04W 4/024* | (2018.01) |
| *H04W 4/04* | (2009.01) |
| *H04W 4/40* | (2018.01) |

(52) U.S. Cl.
CPC ............. *G08G 1/143* (2013.01); *G08G 1/144* (2013.01); *G08G 1/146* (2013.01); *G08G 1/148* (2013.01); *G08G 3/00* (2013.01); *H04W 4/024* (2018.02); *H04W 4/046* (2013.01); *G06Q 2240/00* (2013.01); *H04W 4/40* (2018.02)

(58) Field of Classification Search
CPC ........ G08G 1/143; G08G 1/146; G08G 1/148; G08G 3/00; H04W 4/046; G06Q 2240/00
USPC ......................................................... 340/932
See application file for complete search history.

(56) References Cited

U.S. PATENT DOCUMENTS

| | | | |
|---|---|---|---|
| 2006/0250278 A1* | 11/2006 | Tillotson ................. | G08G 1/14 340/932.2 |
| 2007/0040701 A1* | 2/2007 | Browne ................... | G08G 1/14 340/932.2 |
| 2008/0033640 A1* | 2/2008 | Amano .............. | G01C 21/3476 701/414 |
| 2008/0136674 A1* | 6/2008 | Jang ....................... | G08G 1/017 340/932.2 |
| 2013/0245944 A1* | 9/2013 | Rutten .................. | G01C 21/36 701/533 |

* cited by examiner

*Primary Examiner* — Jack K Wang
(74) *Attorney, Agent, or Firm* — King & Schickli, PLLC (57) ABSTRACT

A method of directing a vehicle (100) to an allocated area (126) includes obtaining (204) data representing a current geographical location of the vehicle; using (208) the geographical location data to identify at least one destination location (122), each said destination location having a set of allocatable areas; checking (208) availability of the allocatable areas at the at least one destination location in order to allocate a said available allocatable area to the vehicle, and generating data for use in directing (214) the vehicle to the area allocated to the vehicle.

20 Claims, 3 Drawing Sheets

ALLOCATING AN AREA TO A VEHICLE

This application is a continuation application of U.S. patent application Ser. No. 14/344,947, filed on May 22, 2014, entitled "Allocating An Area To A Vehicle," which is the national stage of PCT/GB2012/052276, filed on Sep. 14, 2012, which claims priority from U.S. Provisional Application 61/668,215, filed Jul. 5, 2012, Great Britain Application No. 1211970.7, filed on Jul. 5, 2012, and Great Britain Application No. 1115897.9, filed Sep. 14, 2011, the entire contents of each being fully incorporated herein by reference.

FIELD OF THE INVENTION

The present invention relates to allocating an area, such as a berth or parking space, to a vehicle.

BACKGROUND OF THE INVENTION

It is known for marinas and the like to rent out berths for vessels. However, if a boat-owner does not have a space rented in advance in a particular location then he/she may not be able to stay there. Similarly, parking spaces for cars and the like are conventionally either allocated on a long-term basis (e.g. residential street parking) or on an ad-hoc basis upon arrival at a car park (e.g. "pay and display" ticketing machines or street parking). It is not uncommon for vehicles to be taken to a particular location without knowing until they arrive whether or not there are any spaces available. There is therefore a need to be able to allocate areas, such as boat berths or parking spaces, to users of vehicles in a reliable and convenient manner.

Embodiments of the present invention are intended to address at least some of the above mentioned problems. Some embodiments can accurately obtain information in a real-time manner regarding availability of spaces, thereby ensuring that a space will actually be available for the vehicle when it is taken there.

SUMMARY OF THE INVENTION

According to a first aspect of the present invention there is provided a method of directing a vehicle to an allocated area, the method including:

obtaining data representing a current geographical location of the vehicle;

using the geographical location data to identify at least one destination location, each said destination location having a set of allocatable areas;

checking availability of the allocatable areas at the at least one destination location in order to allocate a said available allocatable area to the vehicle, and generating data for use in directing the vehicle to the area allocated to the vehicle.

For the avoidance of doubt, the term "vehicle" used herein is intended to cover a wide range of transport, including vehicles that travel over/through land, water and/or air. A non-exhaustive list of examples includes cars, motorbikes, trucks, buses, aircraft and boats.

The method may further include obtaining further data relating to the vehicle and using this further vehicle data to identify the at least one destination location. For example, the method may include obtaining a fuel level of the vehicle to identify destination locations that are within range of the vehicle based on the fuel level. Further, the method may include obtaining information relating to travel between the current geographical location and destination location, e.g. information relating to weather conditions, information relating to shipping lanes or charts, information relating to traffic conditions, information relating to road works, information relating to tolls or congestion charges, etc.

The method may further include obtaining data relating to at least one user preference in order to identify the at least one destination location. For example, a user may specify a price range (or threshold) and the method may compare the user price preference with information relating to prices of allocatable areas at the destination locations. The user preference may specify that the method is to identify a said destination location that is nearest to the current geographical destination of the vehicle.

The method may present information relating to the identified destination locations and allow the user to select at least one of the identified destination locations for the step of checking availability of the allocatable areas.

The data for directing the vehicle may be used by a navigation or autopilot system to navigate or transport the vehicle to the destination location having the allocated area. Upon arrival at the allocated area the method may further use the navigation or autopilot system. For example, precise coordinates of the allocated area may be displayed by the navigation system and/or the precise coordinates may be used by the autopilot system to guide the vehicle to dock in the allocated area. In alternative embodiment, a sensor arrangement fitted on/adjacent the vehicle and/or the allocated area may be used to dock the vehicle in the allocated area. The sensor arrangement may detect a position of the vehicle relative to at least one feature of the allocated area.

The method may include identifying and monitoring a said vehicle located in the allocated area. The method may monitor whether the vehicle is approaching, or exceeding, its allocated time in the allocated area. The monitoring may be continuous or intermittent and in some cases can be performed by sensors located at or adjacent the allocated area. If the method detects that the vehicle is exceeding its allocated time in the allocated area then the method can include imposing a penalty on a user of the vehicle. The penalty may comprise a financial penalty. Additionally or alternatively, the penalty may include depriving the vehicle of a service at the allocated area, e.g. cut off water; sewerage; electricity and/or fuel services.

The method may include detecting if another said vehicle is prevented from using the allocated area due to the first mentioned vehicle exceeding its allocated time and seeking an alternative allocatable area for the other vehicle.

The method may include computing an estimated time of arrival of the vehicle at the allocated area. The method may further include updating the estimated time of arrival if a user of the vehicle interrupts or makes a detour from a route to the allocated area. The method may further include updating the estimated time of arrival based on weather condition and/or traffic/shipping lane information.

The method may further include computing a cost value associated with travelling from the current geographical location to a said destination location. This computing of the cost value can include computing a cost of travel based on distance between the current geographical location and the destination location; en route weather conditions; en route traffic or shipping information; fuel usage (which may be based on estimated speed of the travel and/or weather conditions and/or shipping lane information); weight of the vehicle (possibly including onboard materials, such as fuel, water, number of people onboard, etc). In some cases, a waterline monitoring device can be used to compute the weight of the vehicle. In other cases, a load sensor can be used to compute the weight of a land-based vehicle. In some cases, a reading from a foul sensor can be used in the cost computation.

The vehicle may comprise a waterborne vessel and the allocatable areas may comprise berths. Alternatively, the vehicle may comprise a motor vehicle and the allocatable areas may comprise parking spaces.

According to another aspect of the present invention there is provided a system adapted to direct a vehicle to an allocated area, the system including:

a location device for obtaining data representing a current geographical location of the vehicle;

a device configured to use the geographical location data to identify at least one destination location, each said destination location having a set of allocatable areas;

a device configured to check availability of the allocatable areas at the at least one destination location in order to allocate a said available allocatable area to the vehicle, and a device configured to generate data for use in directing the vehicle to the area allocated to the vehicle.

Embodiments of the invention may be implemented using a client/server hardware/software arrangement.

According to yet another aspect of the present invention there is provided a method of allocating an allocatable area to a vehicle (or an owner/user of the vehicle), the method including:

identifying at least one destination location meeting at least one user-selected criteria, each said destination location having a set of allocatable areas, and checking availability of the allocatable areas at the least one destination location in order to allocate a said available allocatable area to the vehicle.

According to yet another aspect of the present invention there is provided a method of monitoring usage of allocatable areas by at least one vehicle, the method including:

detecting presence of at least one vehicle at or adjacent an allocatable area;

performing at least one action in response to the detection of the vehicle.

According to a further aspect of the present invention there is provided a method of controlling access of a vehicle in and/or out of an area, the method including:

transferring a message from an area control system to a vehicle system, the message relating to access of the vehicle into and/or out of the area. The area can be a port or the like. The message can instruct the vehicle and/or its user to wait in a specific location before proceeding in or out of the area.

According to another aspect of the present invention there is provided a method of generating a route to be traversed by a vehicle, the method including:

receiving user input regarding at least part of a route to be travelled using a vehicle;

computing at least one point on the route, and displaying the computed at least one point to the user, and/or causing the vehicle to transverse at least part of the route including the computed at least one point.

For instance, the user may input a starting point for the route and the method may compute an end point for the route (or vice versa). Alternatively, the user may enter a starting point and an end point for the route and the method may compute at least one intermediate point on the route, e.g. based on the user providing a general area/boundary for the route; the user providing information regarding points of interest preferably included on the route, and the like.

Systems corresponding to the methods described herein can also be provided.

According to another aspect of the present invention there is provided a computer program element comprising: computer code means to make the computer execute methods substantially as described herein. The element may comprise a computer program product.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWING FIGURES

The invention may be performed in various ways, and, by way of example only, embodiments thereof will now be described, reference being made to the accompanying drawings in which.

DETAILED DESCRIPTION OF THE INVENTION

Figure 1:
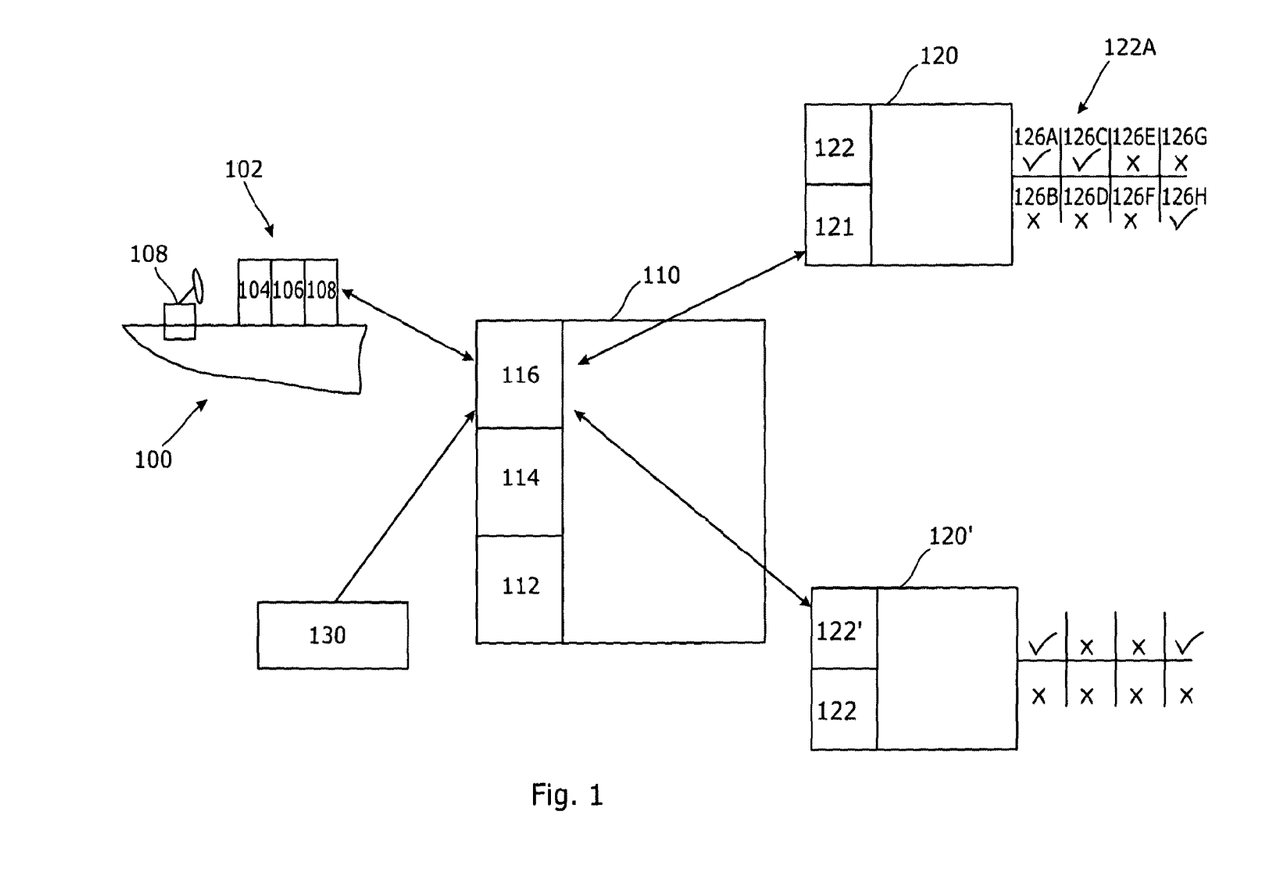
FIG. 1 is a schematic drawing of a first embodiment of the system.

FIG. 1 shows a waterborne vessel 100, which can be a yacht or the like. The vessel has an onboard computing device 102, which may be a desktop computer or part of an integrated navigation system. Alternatively, the device may comprise a mobile device such as a laptop, PDA or smartphone that has been configured to interact with other components of the system as described herein. The computing device will typically include a processor 104, a memory 106 and a communications interface 107, with the memory including code that allows the computing device to function as described herein.

The vessel 100 also includes at least one onboard system 108. In some embodiments the onboard system can include a device that provides data relating to the current geographical location of the vessel, e.g. a GPS device. Other examples of onboard systems that may be used by the system include an engine fuel level monitoring device or a battery level monitor for electrically-powered vehicles. The onboard systems may be ones that are already fitted to the vessel, or they may be components provided and installed specifically for use with the system described herein. It will be appreciated that the examples shown in the Figure can be varied for other versions of the system. For example, for the land vehicle embodiment of FIG. 3 (described below), the computing device 102 may be part of a GPS navigation system fitted in, or on, the vehicle.

FIG. 1 further shows a booking system 110. The booking system will typically comprise computing resources located at the premises of an operator of the system. In the example this takes the form of a computing device having a processor 112, a memory 114 and a communications interface 116. The interface allows the booking system to communicate with the onboard computing device 102 and other devices, e.g. by means of wireless internet, which may involve satellite links or cellular wireless networks, e.g. 4G, or any other suitable communications technology. In some embodiments, at least this part of the booking system may be Cloud-based. The memory of the booking system's computing device includes code that allows it to function as described herein.

Also shown in FIG. 1 are computing devices 120, 120' that are typically located at, or associated with, respective marinas at various locations. Only two are shown in the Figure for ease of illustration, but it will be understood that any number of marinas, located anywhere in the world, can participate in the system. These computing devices can be substantially conventional and typically include processors 121, 121', memory 122, 122' and communications means, etc. Typically, the marina-associated computing devices store and provide data relating to the availability of berths, e.g. 126A-126H at a first marina. This data may be provided by an operator after visual/video inspection of the berths, or may be done in a more automated manner, e.g. by receiving signals from sensors in the berths. In the example, each computing device is associated with one marina, but it will be understood that this can vary, e.g. a single computing device may store and update information relating to berth availability at more than one marina (e.g. marinas operated by the same entity). Further, in some cases, data relating to berth availability may be stored and updated directly in the memory 114 of the booking system computing device 110.

FIG. 1 also shows a further computing resource 130, which may be a remotely-accessible database providing up-to-date information on weather conditions (current, short term and/or long term), shipping lanes, charts, etc. In some embodiments, the booking system 110 can obtain data from at least one such resource over a network, but in other embodiments, the booking system itself may gather and maintain such additional data.

Figure 2:
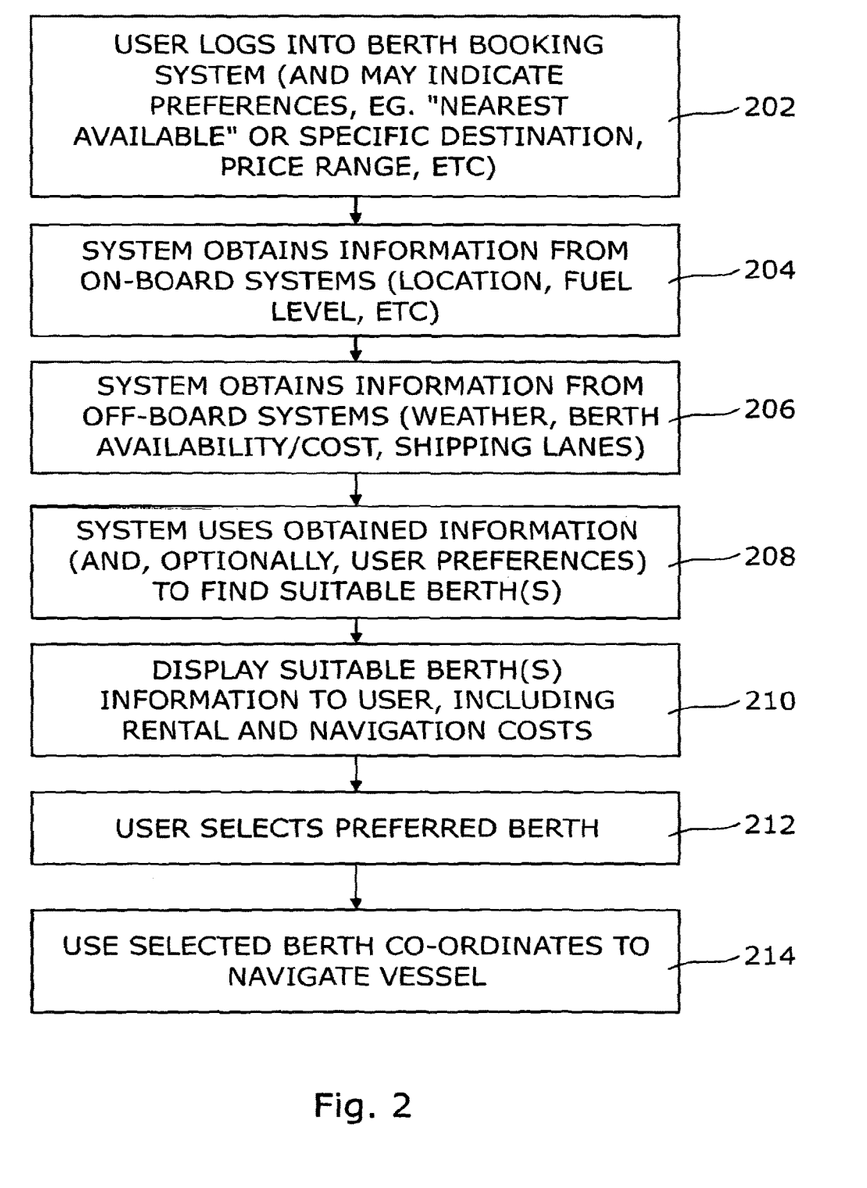
FIG. 2 is a flowchart illustrating example steps performed by components of the first embodiment.

Referring to FIG. 2, example steps performed by the system illustrated in FIG. 1 are shown. It will be appreciated that the steps shown are exemplary only and in alternative embodiments/operating modes some of the steps may be omitted or re-ordered.

At step 202, a user onboard the vessel 100 logs into the booking system using the onboard computing device 102. This may involve connecting to a website operated by the booking system 110 over the internet, for example. It will be appreciated that it is possible to configure the system so that the various steps described herein are performed by code executing on the onboard computer 102 and/or the booking system 110 computer. Typically, the user will need to register/subscribe to the system and will be provided with a username/password to log in, although in alternative embodiments access to the system may be more open (e.g. on a pay-per-booking basis). After logging in, the user may be invited to indicate a preference for a location where he wishes to find a berth. This may be done by specifying coordinates or a location name, for example. Alternatively, the user may select the "nearest available" berth to the vessel's current location, or the system may be configured to offer at least one possible berthing location. The "nearest available" berth could be calculated as the one "as the crow flies" in terms of distance; the nearest in terms of estimated time to arrive, or the nearest in terms of least cost to get there (see below). In some cases, the cheapest port might not be the geographically closest because there may be a storm or the like between the vessel and it. The system can also take into account shipping lanes and charts, etc (having to avoid shallow, rocky areas, etc). Embodiments of the system may also be able to interface with sonar, radar, thermal night vision and any other navigation/route planning In embodiments that are able to obtain weather forecasts/data from local meteorological offices and the like, the system may also calculate a diversionary route needed to be taken in order to avoid storm, etc. The system can show an alternative route on its display, together with probabilities for the weather event occurring on a route, so that the captain or the like can decide whether or not to use that route. Alternatively, the system can automatically command the vessel's autopilot to follow a route.

In some embodiments, the user can also specify at least one other criteria that the system can use to find a berth, e.g. time/date of arrival/departure, preferred price range, vessel-specific requirements, such as minimum dimensions (e.g. length), availability of electrical supply, etc. Fuel, food supplies, etc., to be provided at a chosen location can be also ordered using embodiments of the booking system at any time, and prepaid at that time, if so desired. In some embodiments, the system can further assist with voyage/route planning, which may or may not include an allocatable area, such as a berth or parking space. For example, when a boat operator (captain or owner, for example) plans a voyage (e.g. a cruise around the Mediterranean), he can input minimal data into the system, such as when he wishes to leave and how long he would like the trip to take/last. This information can be input into the system 102 onboard the boat, which then communicates with the remote system 110. Alternatively, the information can be input directly into the remote system 110, e.g. by a booking operator speaking with the boat user over a phone. The user can also specify more detailed information, such as how long he wishes to spend in a particular port (one night per stop over, for example), or indicate any special interests he may have. For example, he may wish to visit the Cannes Film Festival and attend a music event in Sardinia. The system 110 can have points of interest stored and businesses/marinas can be encouraged to provide details of points of interest and events in their area for inclusion in this database. The system 110 can access this information when planning the voyage.

Further, the system can access Google™ or any other search engine(s), in order to discover events occurring around the relevant areas in the relevant time frame that are not already stored in its database. The system can also be set to recommend events (e.g. based on the user's specified interest), if selected as an option in the user's preferences settings. The system can then suggest stops en route (ports), according to availability of berths in those ports and any other stipulations user has made, such as the necessity to be in a certain port at a certain time, etc.

The system 110 can be instructed to compute a route, which can involve accessing remote data sources (as described below) to avoid bad weather, for instance. If the voyage is to take a longer route than originally specified as a result then the system can flag this and/or provide an explanation. Also, if a storm or the like is expected to hit a port on a certain day, then the system can recommend staying longer in an alternative port in order to avoid the storm. This computed itinerary can include suggested refueling points (the system may be able to access local fuel prices via external resources), taking into account factors such as the boat's current position, displacement, fuel range, etc. In some cases, fuel prices can also be obtained from the port system, or the port management part of the booking system can automatically be updated when a marina/port operator adjusts its fuel prices. In some cases, fuel prices can be varied according to the quantity ordered. When planning a voyage, the user may wish to update the system with information regarding additional loads on the boat, so the necessary refueling, etc., can be re-calculated before the trip commences. If the displacement sensors (see below) indicate different loading on the day of departure on the trip, then the system can update the user at that time, informing him regarding any changed calculations. Also, the weather forecasts may change on the day of departure, and the system can also update the user regarding this and adjust the voyage accordingly, either automatically or with the user's permission, depending on the user preferences selected. Other variables that can change on the day of the departure can also be taken into account by the system.

At step 204 the system obtains information form at least one of the onboard systems 108. Examples of such information include the current position of the vessel and the amount of fuel available.

At step 206 the system may obtain information from the off-board systems 130, such as information relating to weather conditions, charts and/or shipping lanes and/or availability of items relating to points along the computed route, such as tickets for an event or a table at a restaurant.

At step 208 the system uses the onboard data and any data obtained from the off-board resources to try to find a suitable berth(s) and/or route. The skilled person will appreciate that there are various ways of achieving this. For example, in terms of berths, the system may first perform checks relating to feasible marina locations:

Is user-selected marina location within fuel range?
Which marina location(s) are within fuel range?
Which marina location(s) are within a minimum distance of the vessel's current location?

These checks may return a list of at least one marina location to which the vessel can travel and the system may then check whether there are any available berths at those marina(s). The skilled person will appreciate that there are several ways of performing such checks and that various data structures and search algorithms may be used to perform the checks in an efficient manner. For instance, the booking system computer may store a database of berths at the marinas registered with the system, each berth being labeled (based upon data provided by the marina computing devices 120 in real-time) as "available" or "unavailable" (typically over specific time periods). An example of the type of information that may be stored in the database fields is given below, but it will be understood that the database contents and format can vary:

| Berth ID | Location | Time/ Date availability | Cost per hour | Other information |
|---|---|---|---|---|
| 1000 | Poole, UK | Sept $1^{st}$: 0:00-5:00 available; 5:01-18:00 unavailable; 18:01-23:59 available. Sept $2^{nd}$: 0:00-18:00 unavailable . . . | £5 | 12.5 m; electrical supply, etc |
| 1002 | Poole, UK | Sept $1^{st}$: . . . | £8.50 | 20.0 m; no electrical supply, etc |
| 1004 | Monte Carlo, MC | Sept $1^{st}$: . . . | . . . | . . . |

Further checks relating to available berths may also be performed, e.g. whether the cost is within the price range specified by the user; whether the dimensions are suitable for the vessel, etc. In some embodiments, when the system is set-up/installed, details such as the vessel/vehicle make/model/dimensions, etc., can be input and it may also be linked to the vehicle's satnav/GPS/tracker systems, so that the berthing charges can then be made according to the size of the vessel. In embodiments for land-based vehicles, pricing may be based on dimensions (length, width, height, etc.) of cars, etc.

These steps may return a list of at least one marina having at least one available berth and the system may then check travel conditions between the vessel's current location and the location(s) of the available berth(s), e.g. using weather data obtained from the off-board resources. If such further checks indicate, for instance, that weather conditions for travel to a particular available berth is unfavourable then that berth may be eliminated from the list.

The system can also compute a total cost of getting to and/or using a berth, in terms of fuel use and time, etc. This calculation can take into account, among other things, distance and weather en route: different routes may be calculated, taking into account different weather forecasts on the different routes. The fuel usage can be calculated according to the current weight of the vessel (including current fuel, water, number of people onboard, etc.,), which the system can monitor continuously or intermittently. This can involve a (existing or system-specific) vessel waterline monitoring device (to measure boat displacement) and/or vessel management systems (which indicate loads on board and displacement), etc. In embodiments for land-based vehicles, a load sensor can be used to compute the weight of a land-based vehicle. In addition, there can be (existing or system-specific) foul sensors fitted to hull and propellers/rudders, etc., in order to tell the system the level of foul on the hull and propellers, as this can also affect the time and fuel consumed (whenever the boat is de-fouled, the system can be updated with this information, so it can monitor when next de-foul is due, taking into account when the boat was last de-fouled and measurements from the fouling sensors, etc.). There may be other factors that can be taken into account when calculating how long it will take/cost to get to berth. Fuel use is also affected by the weather en route. Traffic/shipping lane conditions can be taken into account, when calculating and the total cost and the system can calculate the impact of weather events on the overall cost. The cost of an electricity supply, fuel, water, etc., can also be used in the computation. Therefore, when calculating the cost, there will be the cost of the berth plus these other factors: all or some of these variables can used in the calculation in order to give an overall cost of the berth (i.e. travelling to it, etc.), as well as the cost of the berth rental itself. After performing such checks/calculations a list of one or more available berths may be made available by the system, each possibly being associated with a cost or cost-based rating. In cases where no berths meeting the user's criteria are found then the user may be invited to amend his/her search criteria.

The costs can also be taken into account by the system in order to give the user a suggested itinerary/route according to costs. The costs can be itemised in the suggested itinerary. As mentioned above, the system can take into account any special events which are due to occur near various ports, and may list these on the display. The system can recommend alternative dates, in order to reduce costs if selected. The user can adjust the itinerary according to his wishes and plans, then instruct the system to proceed with the bookings, etc. The system can be set up to operate automatically or request user's permission for all or particular variables/ actions.

In embodiments where the system processes data relating to port facilities and enable users to make comments about ports, facilities (including restaurants, etc.) and local surroundings, the user can use all this information to finalise the bookings based on a computed route suggested by the system. Some embodiments can also directly book refueling, hotels, restaurants, etc., in a similar manner to the booking of berths, over a communications network.

At step 210 information relating to the found available berths may be displayed to the user. Such information can include details regarding the berth location and possibly travelling time, cost, marina amenities and facilities, etc. The found berths may be displayed as a list, e.g. ordered according to the total calculated cost, and the user may be able to select his/her preferred option at step 212. In embodiments where the system is used to generate a suggested itinerary/route then this kind of information can also be shown on the screen display, with notes (giving reasons for a longer route or route diversion, for example, or the reason for staying 3 nights instead of two in a particular port, for example).

In alternative embodiments/operating modes, e.g. when the user has selected "nearest available" berth, then the display/selection steps 210, 212 may be omitted. In some embodiments, the booking system will also arrange for (typically time-based) payment to be made from the user (e.g. via a credit/debit card, or from a bespoke pre-payment account) to the owner/operator of the selected berth. In some embodiments, the system can have the user's payment details pre-programmed into it, either through the vehicle satnav/tracker or directly into a website/app based interface. Part of this payment may also be awarded to the booking system operator. Alternative payment structures include marinas handing over the booking process to the booking system operator, and the booking system operator then giving all or some of the proceeds to the marinas, possibly minus a service charge. The database entry relating to the availability of the berth as stored by the marina computer 120 will also be updated accordingly.

At step 214 the coordinates of the selected berth are used to navigate the vessel from its current location to the location of the berth. This may be done by the user manually navigating the vessel using the coordinates, or he/she may enter the coordinates into an onboard navigation system. The user interface may include a touch screen or any other suitable arrangement. In alternative embodiments, the booking system may directly enter the coordinates into a vessel navigation or autopilot system, or may directly interact with such systems to transport the vessel to its destination. Upon arrival at the berth, the system may further interact with the navigation/autopilot system of the vessel. For example, the precise coordinates of the berth may be displayed on the navigation system and/or these coordinates may be used to guide the vessel into the berth. If the navigation/autopilot system is not suitable for these fine-tuning berthing purposes, then an external arrangement for detecting the relative positions of the vessel and allocated berth may be provided. For instance, a wireless interface can be set up between the vessel and part of the berth area. This can include a sensor device installed on/under the vessel at a pre-determined position. Typically, it will be placed at same spot on all vehicles of same make/model, so the system, when uploaded with the vehicle data, knows how far the front, rear and/or sides of the vehicle are from the sensing device. This sensor can read in order to determine the position of the vessel with respect to the berth and interface with the navigation system to guide the vessel at least partially into the berth. In alternative embodiments, the sensor may be fitted at or adjacent the berth. As the system identifies vessels currently in the berths and knows which vessels are to use the berths in future from the booking information, the berth areas can be selected according to factors such as the vessel dimensions. Price sensitive berthing/parking can also be utilised, so prices can be adjusted according to when the berth is booked, for how long it is booked, and/or supply/demand levels at that time.

Some embodiments of the system may be configured to attempt to prevent users overstaying at a berth. The system may monitor the time and whether a berthed vessel is approaching, or exceeding, its allocated time at the berth. The monitoring may be continuous or intermittent and in some cases can be performed by sensors located at the dockside, which interface with the vessel, thereby recognising which vessel is docked there or whether the berth is empty. It will be appreciated that the system can identify a vessel in many ways, such as by means of a tracking devices, a scanner and unique bar code, or WiFi identification with respect to the IP address of vessel's onboard computing system, etc., possibly in combination with GPS technology, which identifies the position of the vessel (along similar lines to known systems that detect the position of mobile phones), which may home in on the vehicle's onboard computers/satnav system. Therefore, this system will have to remain on a standby mode for waterborne vessels, in order for the system to be able to monitor the location of the ship. It will also be appreciated that there are alternative vehicle location monitoring devices, such as cameras, etc.

In some cases, a docking arm device (such as that described in GB2369607, for example) may include a communications link that can be used to connect the vessel's computer system to a dockside computing device, which then communicates with the port, e.g. via WiFi. In some embodiments, communication may be via wired interfaces. In such embodiments, this can effectively result in an entirely automatic boat. Alternatively, the vessel's onboard computer can communicate directly with the marina/port computer via WiFi or the like. If user of the vessel does not wish to be detected at all times, then this system can be switched off by the user when not in port; however, it will normally need to be kept active when in port, so that the port authorities/system know which vessels are in which berths. The system may include a "lock out" feature to prevent vessel users from switching off this aspect of the system while in port. The can help port management systems be continually updated and can then automatically update the berth booking system accordingly.

Vessel users can be encouraged to leave any tracking devices switched on at all times, by way of discount on the berth booking fees and/or points, which can be used in similar way to supermarket loyalty card schemes. Boat/port communications can be enhanced this way, as the port would then have an overall picture of where boats are and their Estimated Time of Arrival (ETA) at the port. The ETAs can be continually updated by the system, taking into account changing weather and weather forecasts etc. If the vessel changes route manually or decides to stop, etc., (for example, if the boat owner wants to go for a swim), the onboard system can prompt the captain or the like with a question such as how long the stop will be for and will the journey to the port then be resumed, so it can then update the relevant port where the berth is booked. As the vessel gets closer, the port systems can then inform the boat systems, of a port entry time. This can avoid queues of boats waiting to get into and out of ports at busy time periods.

If the boat user stops en route then the onboard system can alert the captain or the like as to when the boat should then resume its trip to port, in order to meet the time slot. If the captain chooses to delay the stop longer, the system can then alert the captain regarding any extra costs, such as extra fuel needed for faster cruise speed, etc., in order to still meet the ETA and/or lost points/penalties incurred for late arrival. Of course, the port may wish to induce better time management in vessels by introducing incentives and/or deterrents/penalties to encourage boats to abide by the agreed arrival time. Indeed, when booking a berth, the marina can offer a flexible arrival time and a fixed arrival time booking, which would be reflected in the prices (just like flexible flight/Channel tunnel tickets, etc.). This encouragement of good time keeping is especially important during busy times and when large ocean liners are due to arrive/leave port, as they can take an hour to maneuver, etc.

If a vessel arrives at a port/marina location unannounced, then its onboard system can be used to display a plan of the port and surrounding area, indicating, with a red cross, for example, where the boat should wait and for how long, while port traffic is handled. This "holding system" is similar to known flight control systems. In some cases the system can indicate onscreen, the route the port would like the vessel to take to get to any berth that has been booked/allocated before/whilst the vessel was waiting. In some cases, the port system can directly communication with the vessel's onboard system and can, for instance, send on onscreen map to the boat, indicating (with a red arrow, for example), where the harbour master would like the boat to wait. The port system screens can show all the boats in the vicinity, with unique labels for each (e.g. according to codes their systems sends to a vessel, or the IP address of onboard systems) and can be programmed to display the vessel's name. In some embodiments, when the harbour master hovers his cursor over a boat name on his system, he may get a short summary of the boat's status, including when it arrived at that point, how much fuel it has on board, and instructions transmitted from the harbour system, etc. A user of a vessel can control what information is transferred between the systems. This technique can be used for vessels waiting to leave the port, as well as those entering.

In some embodiments a basic dock detection device can be provided to alert the marina/port authorities if any vessel enters the dock. This can be an infra-red/laser sensor or camera, etc., that may be in communication with port management systems and/or the booking system. This can detect any vessels that simply enter the port and dock without any prior arrangements or tracking devices. In some cases the system can be extended to cover all vessels entering and exiting a port. Using tracking devices, when a boat passes a certain point at the port entrance (whether arriving or leaving) port management systems are appropriately updated. Embodiments of the system can also be used by the coast guard, as well as a harbour master etc., to send messages/warnings, etc., to vessels.

The system can be set up to send deadline reminders to users (e.g. to their mobile phone, PDAs, or other computing devices (possibly via email, WiFi, 3/4G network, etc.), or to the display of the booking system in the vehicle) and ask whether the user wishes to extend the stay, if space is available. The system can be linked to the SatNav/trackers of vessels and so it will know the position of the vehicles and calculate which vehicles have overrun. In the interests of privacy, if so desired, the user can disable this locating aspect of the system at any time, unless the vehicle is actually berthed/parked in one of the system's berths (this is to prevent over runners becoming "invisible" to the system).

In some cases, if the system detects that the vessel is overstaying, the user will have to pay a penalty and, possibly, the next time he berths, will have to pay a surcharge, e.g. double rate. This can then be reduced back to the standard rate over time, if he builds up record of good time keeping. If another user had booked the berth but couldn't access it due to it being occupied by the overrun vessel, he can be directed by the system to another berth (if available). The other user may also be entitled to a reduction or a full or partial refund of the fee. In some cases if there are no available spaces, the other user may receive a bonus payment (these reduced berthing/parking fees/refunds can be subsidised by the fine/extra fees paid by the user who did not leave on time). In addition to a financial penalty, the system may interact with hardware at the marina/port to cut off power/water/sewage services, etc., to an overrunning vessel. The system can directly control a valve or switch system or the like to achieve this automatically.

In addition to the above "penalty" schemes, or as an alternative, the offending vessel can have an onscreen readout (e.g. reflected onto its window), which states that the vessel is illegally parked. This could make it increasingly socially unacceptable to berth beyond the booked period.

If owners of marinas, etc., do not wish to operate the full system, berth spaces will need to be labeled/numbered/tagged, in order to enable spaces to be individually booked to enable users of the system to see which space has been allocated to them. This simplified system may not allow the spaces to be adjusted according to the vessel size.

In some embodiments, the booking system may continue to operate after an initial available berth selection has been made, e.g. it may monitor weather conditions and may suggest an alternative destination, or automatically change the destination, if it determines that there may be problems navigating to the initial destination.

Figure 3:
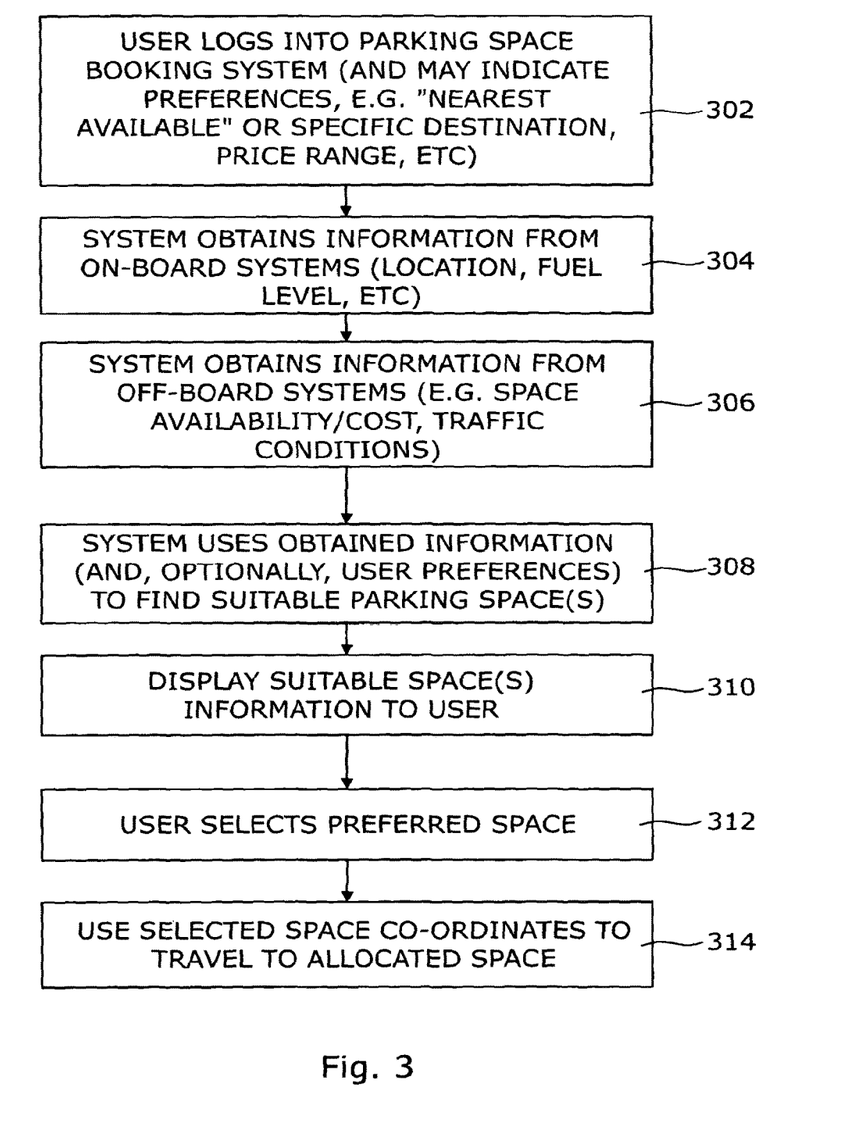
FIG. 3 is a flowchart illustrating steps performed by an alternative embodiment.

FIG. 3 shows steps performed by an alternative embodiment of the system where the allocatable areas comprise parking spaces for automobiles rather than berths for waterborne vessels. At step 302 a user, typically the driver of a car, van or other automobile logs into the booking system using a computing device 102, which may be a mobile device, such as a smart phone with GPS capability, or a component of an onboard navigation system/GPS Sat-Nav. As with the embodiment of FIGS. 1-2, this operation may involve connecting to a website operated by the booking system over the internet, for example, and it will be appreciated that it is possible to configure the system so that the various steps described herein are performed by code executing on the onboard computer and/or the booking system computer. In this case, the booking system computer will gather and/or store data relating to real-time availability of parking spaces in locations operated/owned by entities who have joined the system, e.g. city/regional councils or private car park owners. The space availability data may be based on video surveillance, ticket-operated ingress/egress barriers, etc.

After logging in, the user may be invited to indicate a preference for a location where he wishes to find a parking space, e.g. specifying a post code, town/city, business/residential name/address, landmark, public transport station or street name, for example. Alternatively, the user may select the "nearest available" space to the vehicle's current location. In some embodiments, the user can also specify at least one other criteria that the system can use to find a parking space, e.g. time/date of arrival/departure, preferred price range, etc.

At step 304 the system obtains information from at least one system onboard the vehicle (which can include the user's computing device), such as the current position of the vehicle and/or the amount of fuel available and/or the minimum dimensions of a parking space useable by the vehicle. At step 306 the system may obtain information from off-board systems, such as databases providing information relating to traffic conditions, tolls/congestion charges, etc., in the surrounding areas. In some embodiments, the system can also take into account special events, which may cause excess traffic or road closures, for instance, in order to calculate best place to park. For example, if there is a demonstration march in Hyde Park London, this might involve the closure of Park Lane, for example, so the booking system would take this into account. The system can be made aware of this sort of event by internet searches/notifications or the like. In some cases, the booking system operator may collaborate with news, traffic reports/forecasts and/or road traffic monitoring services, so the booking system is automatically updated in real time. This sort of up-to-date information updating arrangement can also be made with meteorological offices and coast guard for events or weather events on the water.

At step 308 the system uses the user-entered data and any data obtained form off-board resources to try to find suitable parking space(s). As with the waterborne vessel example above, the skilled person will appreciate that there are various ways of achieving this, but, in general terms, the process aims to find a set of parking spaces that meet the user's criteria.

At step 310 information relating to the found available spaces may be displayed to the user. Such information can include details regarding the parking space location and possibly travelling time, cost, etc. The found spaces may be displayed as a list and the user may be able to select his/her preferred option at step 312. In alternative embodiments/operating modes, e.g. when the user has selected "nearest available" parking space, then the display/selection steps 310, 312 may be omitted.

At step 314 data relating to the coordinates of the selected parking space can be used to navigate the vehicle from its current location to the space. This may be done by the user driving to the space using his/her own knowledge of the area, or he/she may enter the coordinates into an onboard navigation system. In alternative embodiments, the booking system may directly enter the coordinates into the navigation system or may directly interface with an automated system to transport the car at least partially to the destination. In some embodiments, the booking system may continue to operate after an initial available berth/parking selection has been made, e.g. it may monitor traffic conditions and may suggest an alternative destination, or automatically change the destination, if it determines that there may be problems travelling to the initially-selected parking space. As with the waterborne example above, additional hardware may be provided to assist the user with parking the automobile in the parking space. For example, the car may be fitted with a sensing device and the parking space can have a strip of metal or other material (e.g. painted symbol), which may be embedded in or on top of the ground surface (this metal strip can run the distance of the line of parking bays). The metal strip under the car could have light sensors, so the system can then calculate the footprint of the car, by sensing the light blocked out by the car. Alternatively, the system may communicate with a SatNav system or the like to make these types of calculations and/or communicate with the user.

The system can assist the driver by indicating that the car can be driven further forward or backed up, so the car is on the correct virtual footprint. It will be appreciated that this metal strip is just one way for the system to define the parking space. In other embodiments, the system can define flexibly-sized parking spaces or the like, which may be defined in accordance with vehicle dimensions, the system being programmed with vehicle model and make information so that the system can then know exactly where the car is positioned in the flexible size car park space and use sensors to instruct the driver accordingly. Alternatively, the system can be connected to/communicate with a known "parking-assist" features included in some vehicles or navigation systems.

Also, as with the waterborne example above, embodiments of the system can be configured to attempt to prevent/deal with vehicles overstaying in booked parking spaces. As electric car charge points are introduced, the charge points can be used as interface connections for cars as an alternative to the vehicle satnav/tracker system. As an added deterrent against overstaying, the system may be configured to cut the power supply (used for battery charging, etc) to any overrunning vehicle.

In some embodiments, the system can be further configured to assist a user with finding addresses. For example, if the user is booking a car park space and does not know the area, he can enter the address he plans to visit and the time of the visit. The system can then take this into account when confirming the booking and suggested arrival time. Then, when the user exits the car, the system can give directions on his mobile phone (e.g. in combination with resources such as Google Maps and/or public transport information, etc.). The system can also take into account that the user may have multiple destinations and may wish to park at a location enabling him to use public transport (for cheaper parking, for example), so that the system can link with public transport networks to give him a suggested route, as well as estimated time of arrival.

In the event that the vehicle is being towed by another party, e.g. for improper parking, the system can update the user as to where the vehicle has been towed, e.g. by providing direction via a mobile phone, using Google Maps and/or public transport information, etc., to the location of the vehicle. The user may also use the system to indicate when he will collect the car, as well as give a penalty fee payment method (again, this can be automatic, as payment details can be stored by the system, when initial parking fee is paid).

The example systems described above provide vehicle operators with a convenient way of finding a suitable area for temporarily stationing their vehicles. It can also help owners of such areas gain an income by renting out their spaces when they are not using them themselves. Private car parks (including individual off-street parking spaces, belonging to private individuals, who want to rent out these spaces or businesses, such as NCP) can also use the system and so it can offer alternatives to public street parking. Some embodiments of the system can give the user a refund for any unused berthing/parking time, if departure is earlier than planned/booked. This can either be a manual or automatic scheme (i.e. the system automatically tracks when the user leaves the allocated area). This can then allow the system to re-assign this allocated area to another user. Although this may not be popular with all parking space/berth owners, it can allow more efficient use of available space and therefore more business efficiency and even less wastage of fuel, as well as good PR for the system owner/operator. As a compromise, a full or partial non-used time refund could be offered, depending on the preferences of the system operator.

It will be appreciated that further variations of the system are possible, e.g. to allocate storage spaces for private or commercial aircraft or the like. The information generated by the system can be displayed on any suitable display technology, e.g. LCD or LED screens or even "heads up" type displays on the windscreen/window of a vehicle. The system can display the recommended path to the allocated area and/or any other information to the user in this way. This can be especially important when vehicles are approaching each other, entering/exiting a port, etc. In order for these embodiments of the system to be fully effective, all vessels, from jet skis to oil tankers would have to have tracking systems, so all vessels can be tracked.

The invention claimed is:

1. A method of directing a first vehicle (100) to an allocated area (126), the method including:
   obtaining (204) data representing a current geographical location of the first vehicle;
   using (208) the geographical location data to identify at least one destination location (122), each said destination location having a plurality of allocatable areas, each said allocatable area being allocatable for use by a respective vehicle for an allotted time period, the end of which is defined by an end time;
   checking (208) availability of the allocatable areas at the at least one destination location in order to allocate a first available allocatable area to the first vehicle, and
   generating data for use in directing (214) the first vehicle to said first area allocated to the first vehicle;
   detecting if said first vehicle is prevented from using the area allocated thereto due to a second vehicle, utilising said area for an earlier time period, exceeding its end time and, therefore, that said area allocated to said first vehicle is not available for use thereby; and,
   in response to said detecting, checking availability of other allocatable areas at the at least one destination location, identifying an available second allocatable area to the first vehicle, and generating data for use in directing the first vehicle to said second area allocated thereto.

2. A method according to claim 1, including obtaining (202, 204) further data relating to the vehicle and using the further vehicle data to identify the at least one destination location (122).

3. A method according to claim 2, including obtaining a fuel level of the vehicle (100) to identify (208) said destination locations (122) that are within range of the vehicle based on the fuel level.

4. A method according to claim 1, including obtaining (206) information relating to travel between the current geographical location and destination location (122).

5. A method according to claim 1, including obtaining (202) data relating to at least one user preference, the user preference data being used (208) to identify the at least one destination location (122).

6. A method according to claim 5, wherein the user preference data includes a price range and the method compares the user price preference with information relating to prices of allocatable areas at the destination locations (122).

7. A method according to claim 5, wherein the user preference data specifies that the method is to find (208) a said destination location (122) that is nearest to the current geographical destination of the vehicle (100).

8. A method according to claim 1, including presenting (210) information relating to the identified destination locations (122) and allowing the user to select (212) at least one of the identified destination locations.

9. A method according to claim 1, wherein the generated data for directing the vehicle (100) is used by a navigation or autopilot system to navigate or transport the vehicle to the destination location (122) having the allocated area (126).

10. A method according to claim 1, wherein upon arrival of the vehicle at the allocated area the method further uses the navigation or autopilot system to display precise coordinates of the allocated area on the navigation system, and/or the precise coordinates are used by the autopilot system to guide the vehicle to dock in the allocated area.

11. A method according to claim 1, wherein a sensor arrangement fitted on/adjacent the vehicle and/or the allocated area is used to assist with docking the vehicle in the allocated area.

12. A method according to claim 1, further including identifying and monitoring a said vehicle located in the allocated area.

13. A method according to claim 12, including monitoring whether the vehicle is approaching, or exceeding, its allocated time in the allocated area.

14. A method according to claim 13, wherein if it is detected that the vehicle is exceeding its allocated time in the allocated area then the method further includes imposing a penalty on a user of the vehicle.

15. A method according to claim 1, further including computing an estimated time of arrival of the vehicle at the allocated area.

16. A method according to claim 15, further including updating the estimated time of arrival if a user of the vehicle interrupts, or makes a detour from, a route to the allocated area.

17. A method according to claim 15, further including updating the estimated time of arrival based on weather condition and/or traffic/shipping lane information.

18. A method according to claim 1, further including computing a cost value associated with travelling from the current geographical location to a said destination location.

19. A system (102, 110) adapted to direct a first vehicle (100) to an allocated area (126), the system including:
   a location device (108) for obtaining data representing a current geographical location of the first vehicle;
   a device (102, 110) configured to use the geographical location data to identify at least one destination location (122), each said destination location having a plurality of allocatable areas (126), each said allocatable area being allocatable for use by a respective vehicle for an allotted time period, the end of which is defined by an end time;
   a device (102, 110) configured to check availability of the allocatable areas at the at least one destination location in order to allocate a first available allocatable area to the first vehicle;
   a device (102, 110) configured to generate data for use in directing the first vehicle to said first area allocated to the first vehicle;
   a device (102, 110) configured to detect if said first vehicle is prevented from using the area allocated thereto due to a second vehicle, utilising said area for an earlier time period, exceeding its end time and, therefore, that said area allocated to said first vehicle is not available for use thereby; and, a device (102, 110) configured to check, in response to said detecting, availability of other allocatable areas at the at least one destination location, identify an available second allocatable area to the first vehicle, and generate data for use in directing the first vehicle to said second area allocated thereto.

20. An integrated system for directing a first vehicle to an allocated area and generating a monetary charge to be levied against said vehicle for remaining in an allocated area for a period of time, the system comprising;

- a positioning module configured to obtain data representing a current geographical location of said vehicle;
- a computer-implemented module configured to use said geographical location data to identify at least one destination location, each said destination location having a plurality of allocatable areas, each said allocatable area being allocatable for use by a respective vehicle for an allotted time period defined by an end time;
- a data retrieval module for accessing and obtaining data representing a size of said first vehicle;
- a data processing module for using the size data to identify one or more allocatable areas at said at least one destination location suitable for use by said first vehicle and checking availability of the identified allocatable areas at the at least one destination location in order to allocate therefrom an available allocatable first area to said first vehicle;
- a navigation module for generating data for use in directing said first vehicle to said first area;
- a processing module for detecting if said first vehicle is prevented from using the first area allocated thereto due to a second vehicle, utilising said area for an earlier time period, exceeding its end time and, therefore, that said first area allocated to said first vehicle is not available for use thereby, and, in response to said detecting, checking availability of other allocatable areas at the at least one destination location, identifying an available allocatable second area and allocating said second area to the first vehicle, wherein the navigation module is configured to generate data for use in directing the first vehicle to the second area allocated thereto; and
- a calculation module for calculating a monetary charge to be levied in respect of said first vehicle based on said size of said first vehicle and a time period for use of said allocated second area.

* * * * *